United States Patent [19]

Yamada

[11] Patent Number: 5,793,621

[45] Date of Patent: Aug. 11, 1998

[54] SWITCHING POWER SUPPLY FOR COMPUTER-DRIVEN DISPLAYS OR THE LIKE

[75] Inventor: Tomoyasu Yamada, Niiza, Japan

[73] Assignee: Sanken Electric Co., Ltd., Saitama-ken, Japan

[21] Appl. No.: 812,427

[22] Filed: Mar. 6, 1997

[30] Foreign Application Priority Data

Mar. 19, 1996 [JP] Japan ............... 8-090120

[51] Int. Cl.$^6$ ............... H02M 3/335; H01J 29/70
[52] U.S. Cl. ............... 363/21; 363/95; 363/132; 315/411
[58] Field of Search ............... 363/21, 16, 17, 363/95, 97, 98, 132; 315/411; 358/190

[56] References Cited

U.S. PATENT DOCUMENTS

| | | | |
|---|---|---|---|
| 4,034,281 | 7/1977 | Morita et al. | 323/17 |
| 4,646,217 | 2/1987 | Baroni et al. | 363/17 |
| 4,954,758 | 9/1990 | Rusk | 315/411 |
| 5,481,450 | 1/1996 | Lee et al. | 363/21 |
| 5,619,403 | 4/1997 | Ishikawa et al. | 363/21 |

*Primary Examiner*—Peter S. Wong
*Assistant Examiner*—Rajnikant B. Patel
*Attorney, Agent, or Firm*—Woodcock Washburn Kurtz Mackiewicz & Norris LLP

[57] ABSTRACT

A power supply system has a switching element to be turned on and off for d.c. to d.c. conversion of a unidirectional supply voltage in synchronism with horizontal synchronizing pulses used for line by line synchronization in a computer display. Since commercial computer systems commonly make selective use of horizontal synchronizing pulses at two different repetition rates, one of which is too high for driving the switching element, the horizontal synchronizing pulses generated at either rate are directed into an amplitude modulator circuit where the pulses are modulated to have either of two different predetermined amplitudes according to their repetition rates. The repetition rate of the horizontal synchronizing pulses being generated is determined from the amplitude of the amplitude modulated horizontal synchronizing pulses, and the switching element is driven at the lower rate even if the horizontal synchronizing pulses are being generated at the higher rate.

7 Claims, 9 Drawing Sheets

1

SWITCHING POWER SUPPLY FOR COMPUTER-DRIVEN DISPLAYS OR THE LIKE

BACKGROUND OF THE INVENTION

This invention relates to electric power supplies, to switching power supply systems, and, more specifically, to those suitable for use in conjunction with the displays of computer systems, among other application.

Switching power supply systems have been known and used extensively for powering television receivers and computer-driven displays, as described and claimed for example in U.S. Pat. No. 5,481,450 to Lee et al. It has also been known, in such power supply systems, to turn the switching element, which is employed for d.c. to d.c. conversion of the unidirectional supply voltage, on and off in step with the horizontal synchronizing pulses which are customarily used for line by line synchronization in the displays. Such operation of the switching element in synchronism with the horizontal synchronizing pulses is known to make constant the frequency of the noise produced by the switching element, permitting easy elimination of the noise. U.S. Pat. No. 4,034,281 to Morita et al. is hereby cited as teaching the control of the switching element by the horizontal synchronizing pulses.

Such switching power supply systems have proved to offer in conveniences when used for powering the displays of compute r systems commercially available today. Generally, computer-driven displays are so made that the repetition rate of the horizontal synchronizing pulses is not fixed but varied between, say, 32 kHz and 64 kHz. According to the prior art, therefore, the switching element was turned on and off at such variable rates, giving rise to disadvantages when the repetition rate was the higher of the two values. The higher repetition rate of the horizontal synchronizing pulses meant a correspondingly greater number of times the switching element was operated per unit length of time. The prior art power supply systems suffered a marked drop in efficiency because of the resulting power loss at the switching element as well as at the rectifying diode used at its output stage.

There is another reason why the actuation of the switching element at too high a rate is objectionable. Driven at such a high rate, the switching element is required to remain closed for such brief periods of time that it failed in some cases to perform positive switching operation.

SUMMARY OF THE INVENTION

The present invention seeks to overcome the noted difficulties of the prior art by providing an improved switching power supply system for computer displays or the like in which the unidirectional supply voltage is constantly switched at an appropriately low rate or rates even though the displays or the like may operate with horizontal synchronizing pulses of inconveniently high repetition rates.

Briefly, the invention provides a switching power supply system suitable for powering a load circuit in a display, among other applications, the load circuit including a horizontal synchronizing pulse generator circuit which generates a series of horizontal synchronizing pulses at either of at least two different predetermined repetition rates for delivery to a horizontal deflection circuit. The switching power supply system comprises a d.c. to d.c. converter circuit to be connected to the load circuit for powering the same, the d.c. to d.c. converter having a switching element for on-off control of a unidirectional supply voltage, and means for smoothing the unidirectional voltage after the on-off control thereof by the switching element. Connected to the horizontal synchronizing pulse generator circuit is a pulse amplitude modulator circuit which, in response to a signal indicative of the repetition rate of the horizontal synchronizing pulses being generated, modulates the incoming horizontal synchronizing pulses into those having the repetition rate unchanged but having either of two different predetermined amplitudes depending upon their repetition rate. Inputting these amplitude modulated horizontal synchronizing pulses, a switching rate timing signal generator circuit generates a series of switching rate timing pulses at the same repetition rate as that of the horizontal synchronizing pulses when their amplitude indicates that their repetition rate is less than a predetermined value, and, when their amplitude indicates that their repetition rate is not less than the predetermined value, at a repetition rate lower than that of these horizontal synchronizing pulses. A switch control signal forming circuit is connected between the switching rate timing signal generator circuit and the switching element of the d.c. to d.c. converter circuit for turning the switching element on and off at a rate determined by the repetition rate of the incoming switching rate timing pulses.

Let the two predetermined repetition rates of horizontal synchronizing pulses be 32 kHz and 64 kHz. Preferably, when the pulses are being generated at 64 kHz, the switching rate timing pulses may be generated at half that higher repetition rate, that is, at 32 kHz. The unidirectional supply voltage is therefore switched at the same low rate no matter which of the two different repetition rates the horizontal synchronizing pulses being generated have. Thus the noted inconveniences heretofore encountered in the art are thoroughly overcome.

A most pronounced feature of the present invention resides in the pulse amplitude modulator circuit which modulates the amplitude of the horizontal synchronizing pulses being generated according to their repetition rates. No separate path is therefore required for transmission of the pulse repetition rate to the switching rate timing signal generator circuit, aside from the path for transmission of the amplitude modulated horizontal synchronizing pulses, affording substantial simplification in the construction of the timing signal generator circuit and the switch control signal forming circuit connected thereto.

The above and other features and advantages of this invention and the manner of realizing them will become more apparent, and the invention itself will best be understood, from a study of the following description and appended claims, with reference had to the attached drawings showing some preferable embodiments of the present invention.

DESCRIPTION OF THE PREFERRED EMBODIMENTS

The invention will now be described in very specific aspects thereof as embodied in the switching power supply system designed specifically for a cathode ray tube display of a computer system. It is understood that the horizontal synchronizing pulses needed by the display are generated at two different predetermined repetition rates of 32 kHz and 64 kHz in this particular embodiment. Sixty four kHz is too high a rate at which to switch the unidirectional supply voltage in the power supply system according to the invention, and is therefore to be halved to 32 kHz when the first mentioned repetition rate is commanded by the computer.

Figure 1:
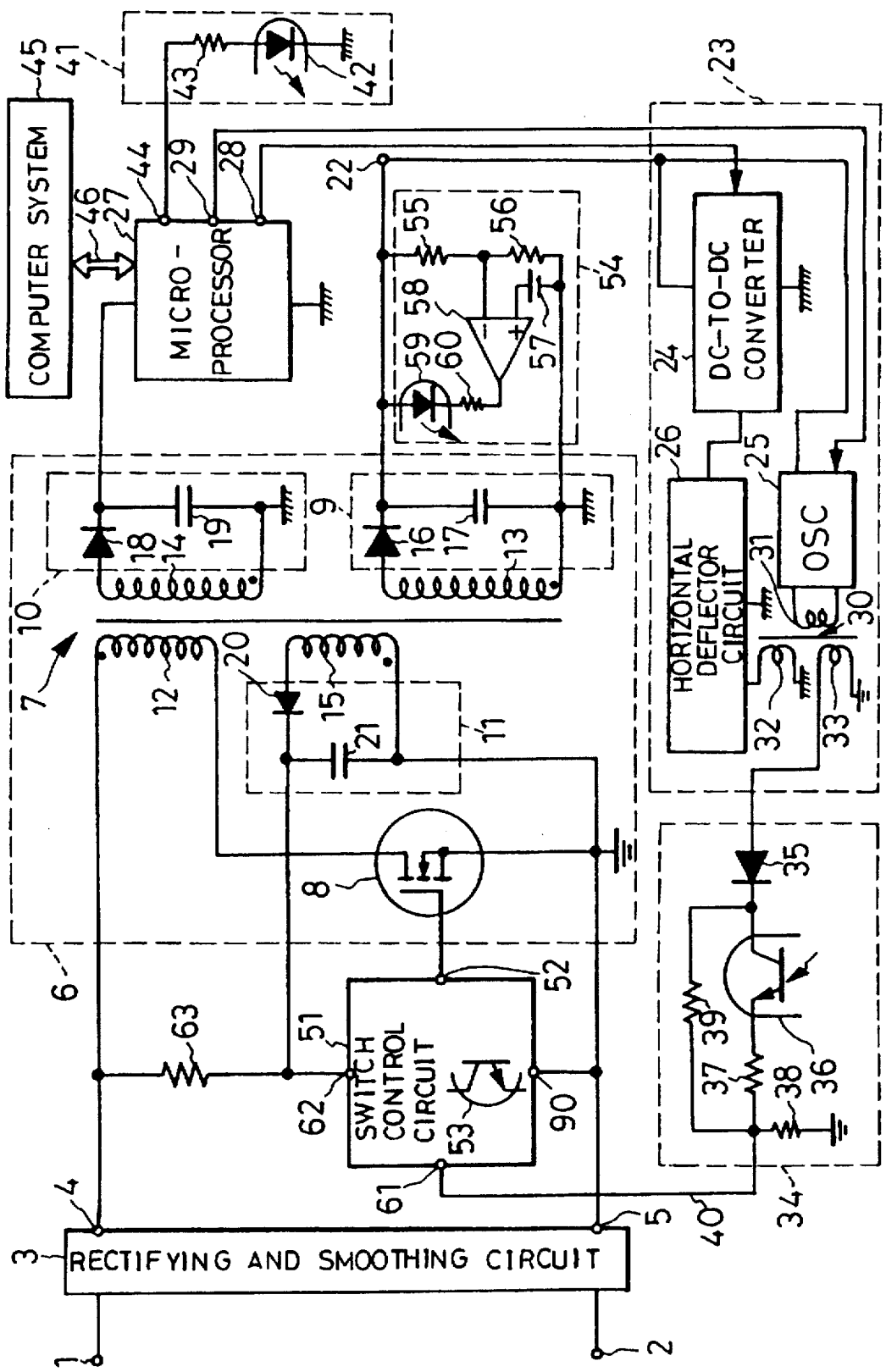
FIG. 1 is a schematic electrical diagram of the switching power supply system for a computer display embodying the principles of the present invention.

The representative power supply system is shown in FIG. 1 to have a direct current power supply in the form of a pair of commercial a.c. supply terminals 1 and 2 and a rectifying and smoothing circuit 3 of any known or suitable make connected thereto. The rectifying and smoothing circuit 3 has a pair of d.c. supply terminals 4 and 5 for supplying a unidirectional voltage. The d.c. supply terminals 4 and 5 are both connected to a d.c. to d.c. converter circuit 6.

Broadly, the d.c. to d.c. converter circuit 6 comprises a four winding transformer 7, a switching element shown as a field effect transistor 8, and three output rectifying and smoothing circuits 9, 10 and 11. The transformer 7 has a primary winding 12, a secondary winding 13, a tertiary winding 14 and a quaternary winding 15, which are all electromagnetically coupled together via a magnetic core. The transformer primary 12 has one extremity connected to the d.c. supply terminal 4, and the other extremity connected to the other d.c. supply terminal 5 via the FET 8.

Connected to the transformer secondary 13, the first output rectifying and smoothing circuit 9 comprises a rectifying diode 16 and a smoothing capacitor 17. The second output rectifying and smoothing circuit 10, connected to the transformer tertiary 14, also comprises a rectifying diode 18 and a smoothing capacitor 19. The third output rectifying and smoothing circuit 11 is connected to the transformer quaternary 15 and likewise comprises a rectifying diode 20 and a smoothing capacitor 21. The rectifying diodes 16, 18 and 20 are all so polarized as to be forwardly biased by the voltages induced in the transformer windings 13, 14 and 15, respectively, during the nonconducting periods of the FET 8.

The first output rectifying and smoothing circuit 9 has an output terminal 22 to which a load circuit 23 is connected. The load circuit 23 is shown to broadly comprise a d.c. to d.c. converter 24, a horizontal sync pulse generator 25, and a horizontal deflection circuit 26. The converter 24 functions to boost the output voltage of the first output rectifying and smoothing circuit 9 preparatory to delivery to the horizontal deflection circuit 26. This circuit 26 is of the familiar construction comprising the horizontal deflection means of the cathode ray tube display, which is not shown in detail because of its well known nature.

A microprocessor 27 has an output 28 connected to a control input of the d.c. to d.c. converter 24. The converter 24 may be set out of operation by a power save signal fed from the microprocessor output 28, in order to avoid waste of power.

The microprocessor 27 has a second output 29 connected to a control input of the horizontal sync pulse generator 25, which generates horizontal sync pulses in response to a horizontal sync timing signal supplied from the microprocessor. The timing signal is supplied in any of a plurality of (two in this particular embodiment) different frequencies, as is standard in the art, so that the pulse generator 25 generates horizontal sync pulses at a repetition rate determined by the particular frequency of the input timing signal. The pulse generator 25 has a supply terminal connected to the output terminal 22 of the first output rectifying and smoothing circuit 9.

Another component of the load circuit 23 is an output transformer 30 having a primary winding 31 connected to the horizontal sync pulse generator 25, a secondary winding 32 connected to the horizontal deflection circuit 26, and a tertiary winding 33 which serves to put out the horizontal sync pulses from the load circuit 23.

Connected to the transformer tertiary 33 is a pulse amplitude modulator circuit 34 for modulating the amplitude of the incoming horizontal sync pulses according to their repetition rates. The pulse amplitude modulator circuit 34 comprises a diode 35, a phototransistor 36, two resistors 37 and 38, which are all connected in series with one another and with the transformer tertiary 33, and a third resistor 39 connected in parallel with the serial connection of the phototransistor 36 and resistor 37. The output line 40 of the pulse amplitude modulator circuit 34 is connected to the interconnection between the resistors 37 and 38, so that the amplitude of the incoming horizontal sync pulses is determined by the voltage dividing ratio of the resultant of the resistances of the phototransistor 36 and resistors 37 and 39, and the resistance of the resistor 38.

The phototransistor 36 is associated with a light emitting diode 42 which is shown as a part of horizontal sync pulse repetition rate signal output means 41. The LED 42 is connected via a resistor 43 to a third output 44 of the microprocessor 27. This microprocessor output 44 provides a binary voltage signal that is of a first value (e.g. one) when the required repetition rate of the horizontal sync pulses to be produced is less than a predefined value of, say, 64 kHz, and of a second value (e.g. zero) when the repetition rate is not less than the predefined value. Thus the voltage signal will be a binary one when the required repetition rate is 32 kHz, and a binary zero when the required repetition rate is 64 kHz.

Consequently, the LED 42 will emit light when the horizontal sync 8 pulse repetition rate is 32 kHz, and will not when it is 64 kHz. The phototransistor 36 of the pulse amplitude modulator circuit 34 will be low in resistance when the LED 42 is emitting light, and high when the LED is not. Thus the pulse amplitude modulator circuit 34 will put out horizontal sync pulses of greater amplitude (e.g. 9 V) when their repetition rate is 32 kHz, and those of reduced amplitude (e.g. 5 V) when their repetition rate is 64 kHz. These output pulses of the two different amplitudes will be referred to as the amplitude modulated horizontal sync pulses or simply as the amplitude modulated pulses, even though these pulses are no longer used for synchronization purposes but for operating the FET 8 according to the principles of the present invention. It will also be appreciated that the optical signal transmission from the repetition rate signal output means 41 to the pulse amplitude modulator circuit 34 enables the electrical separation of the two circuits, affording a greater latitude in system arrangement.

Conventionally comprising a central processor unit, a random access memory, and a programmable read only memory, the microprocessor 27 has its supply terminal connected to the noted second output rectifying and smoothing circuit 10. The microprocessor 27 produces the three aforementioned signals needed by the present invention in response to instructions and other information supplied from a computer system 45 by way of a bus 46.

Figure 2:
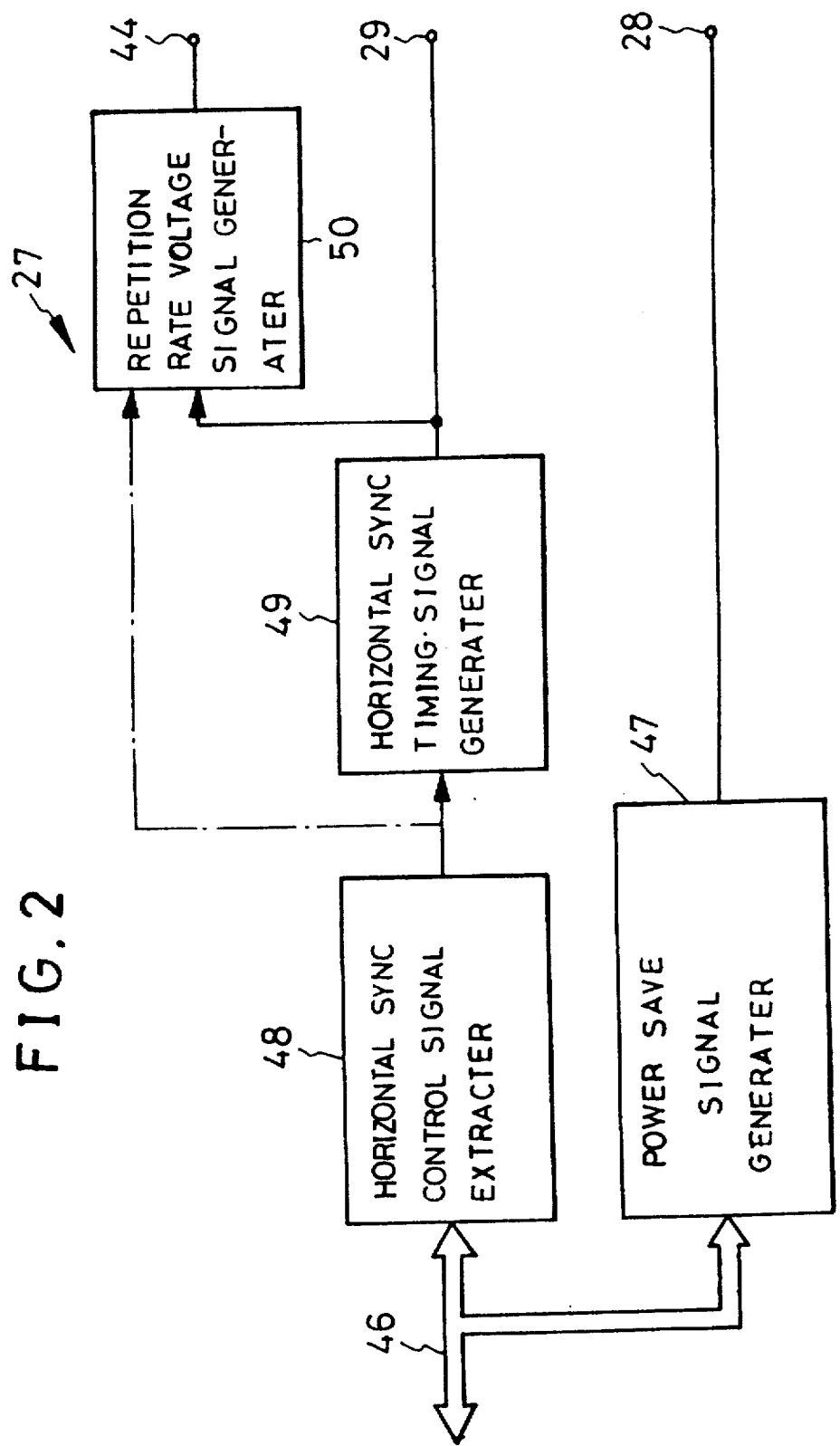
FIG. 2 is a block diagram of an equivalent circuit of the microprocessor used in the FIG. 1 power supply system.

As illustrated block diagrammatically in FIG. 2, the microprocessor 27 may be functionally envisaged as comprising a power save signal generator 47, a horizontal sync control data extractor 48, a horizontal sync timing signal generator 49, and a repetition rate voltage signal generator 50. The power save signal generator 47 produces a power save signal for delivery to the d.c. to dc. converter 24, FIG. 1, of the load circuit 23 from the microprocessor output 28. The power save signal will be in a power saving state when the keyboard, mouse, or any other input means, all not shown, of the computer system 45 has not been operated for a prescribed length of time. The power save signal will cancel the power saving state when any input means of the host computer is operated subsequently.

As the name implies, the horizontal sync control data extractor 48 derives from the computer information supplied over the bus 46 the data representative of either of the two different repetition rates at which horizontal sync pulses are to be produced. Inputting the required repetition rate data, the horizontal sync timing signal generator 49 generates the horizontal sync timing signal which is needed for production of the horizontal sync pulses at the required repetition rate, for delivery to the horizontal sync pulse generator 25, FIG. 1, of the load circuit 23 via the microprocessor output 29.

The repetition rate voltage signal generator 50 relies on the horizontal sync timing signal for producing the noted binary voltage signal indicative of whether the commanded repetition rate of horizontal sync pulses is less than 64 kHz or not. This voltage signal may be high when the horizontal sync pulse repetition rate is less than 64 kHz, and low when the repetition rate is not less than that. Alternatively, as indicated by the dot and dash line in FIG. 2, the signal generator 50 may produce the binary voltage signal from the repetition rate data supplied from the horizontal sync control data extractor 48. This voltage signal is supplied from the microprocessor output 44 to the horizontal sync pulse repetition rate signal output means 41, FIG. 1, thereby to be translated into an optical signal.

With reference back to FIG. 1 the FET 8 has its gate connected to an output 52 of a switch control circuit 51 in order to be switched by duration modulated pulses supplied therefrom. The switch control circuit 51 includes a second phototransistor 53 for making constant the output voltage of the first output rectifying and smoothing circuit 9. The degree of conduction, or resistance, of the phototransistor 53 is to change with the output voltage of the first output rectifying and smoothing circuit 9, resulting in variation in the duration of the pulses supplied to the gate of the FET 8.

Employed for controlling the phototransistor 53 of the switch control circuit 51 is a voltage control signal forming circuit 54 connected between the output of the first output rectifying and smoothing circuit 9 and the ground. The circuit 54 includes two resistors 55 and 56 connected in series with each other between the output terminal 22 of the first output rectifying and smoothing circuit 9 and the ground. The connection between the resistors 55 and 56 is connected to one input of a differential amplifier 58, the other input of which is connected to a reference voltage source 57. A second LED 59 is connected via a current limiting resistor 60 between the output of the differential amplifier 58 and the output terminal 22.

Thus the LED 59 will glow in response to the output voltage of the differential amplifier 58, which output voltage is proportional in turn with the difference between the predetermined fraction of the output voltage from the first output rectifying and smoothing circuit 9 and the reference voltage from the source 57. The intensity of the light produced by the LED 59 will increase in proportion with the output voltage of the circuit 9. Irradiated by this LED 59, the phototransistor 53 of the switch control circuit 51 will conduct accordingly.

The switch control circuit 51 has an input 61 connected to the output line 40 of the horizontal sync pulse amplitude modulator circuit 34 in order to determine the repetition rate of its duration modulated output pulses on the basis of the amplitude of the amplitude modulated horizontal sync pulses supplied therefrom. The switch control circuit 51 also has a supply input 62 connected to the third output rectifying and smoothing circuit 11 and, via a starting resistor, to one output terminal 4 of the input rectifying and smoothing circuit 3. The grounding terminal 90 of the switch control circuit 51 is connected to the grounding terminal 5 of the input rectifying and smoothing circuit 3 and to the smoothing capacitor 21 of the third output rectifying and smoothing circuit 11.

Figure 3:
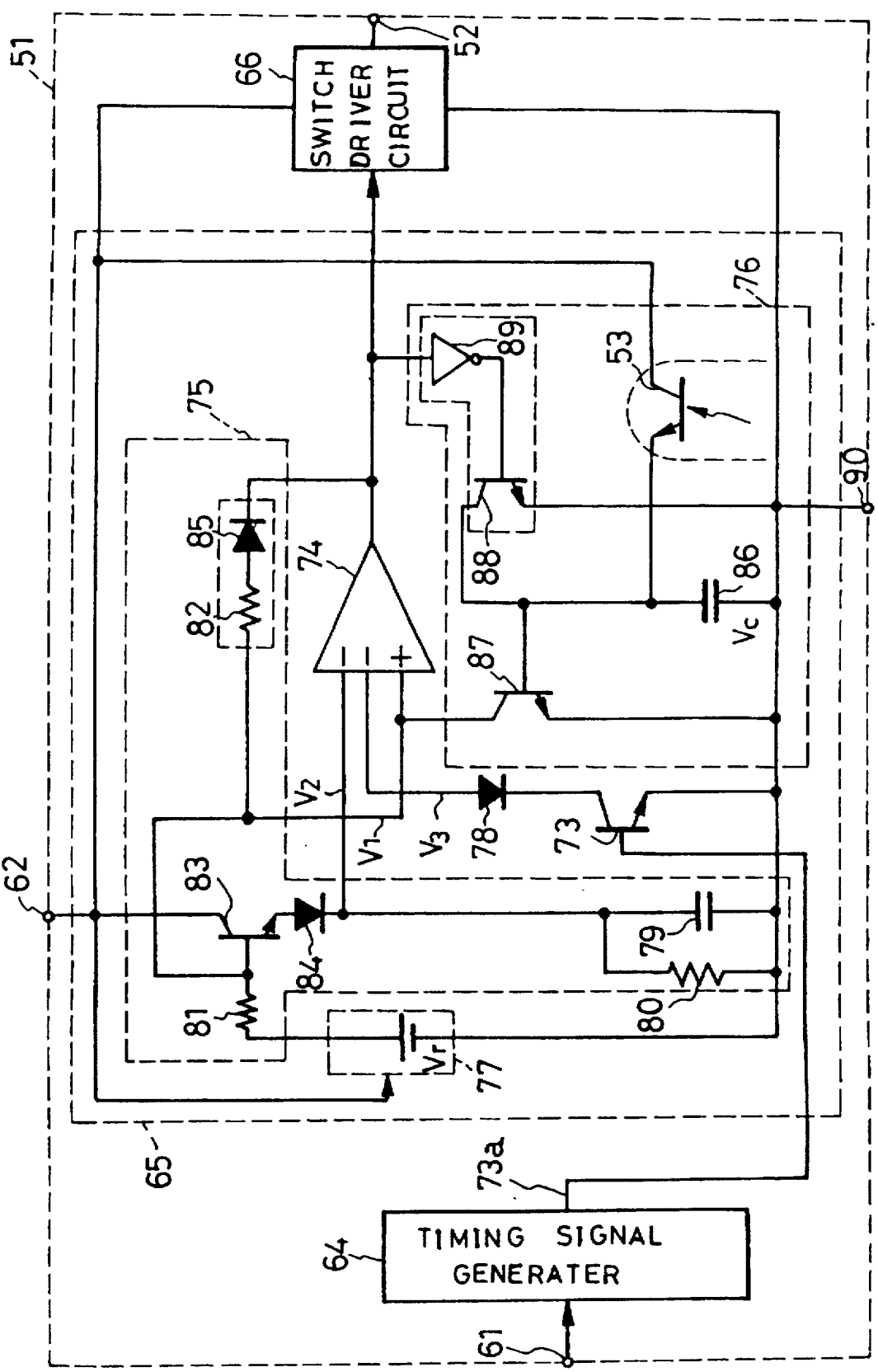
FIG. 3 is a schematic electrical diagram showing in more detail the switch control circuit of the FIG. 1 power supply system.

FIG. 3 is a detailed illustration of the switch control circuit 51. Broadly, this switch control circuit comprises a switching rate timing signal generator 64 for determination of a switching rate, a duration modulated switch control pulse forming circuit 65, and a switch driver circuit 66, which may be fabricated altogether in the form of a hybrid integrated circuit. The listed components of the switch control circuit 51 will be hereinafter detailed one after the other.

As illustrated in detail in FIG. 4, the switching rate timing signal generator 64 has two comparators 68 and 69 both having their inverting inputs connected via a resistor 67 to the input terminal 61 to which, as has been set forth with reference to FIG. 1, is connected the output line 40 of the horizontal sync pulse amplitude modulator circuit 34. The noninverting inputs of the comparators 68 and 69 are connected to respective reference voltage sources $E_1$ and $E_2$. The source $E_1$ may provide a reference voltage of three volts, and the other source $E_2$ that of seven volts.

The output of the comparator 68 is connected directly to the trigger input T of a trigger flip flop 70 whereas that of the other comparator 69 is connected to the set input S of the same flip flop via a delay circuit 71. The delay Td imparted by this delay circuit is less than the duration of each horizontal sync pulse. The Q output of the flip flop 70 is connected to one input of a NOR gate 72, the other input of which is connected directly to the output of the comparator 68. The output line 73a of the NOR gate 72, or of the switching rate timing signal generator 64, is connected to the base of a transistor 73, FIG. 3, of the switch control pulse forming circuit 65.

Figure 5:
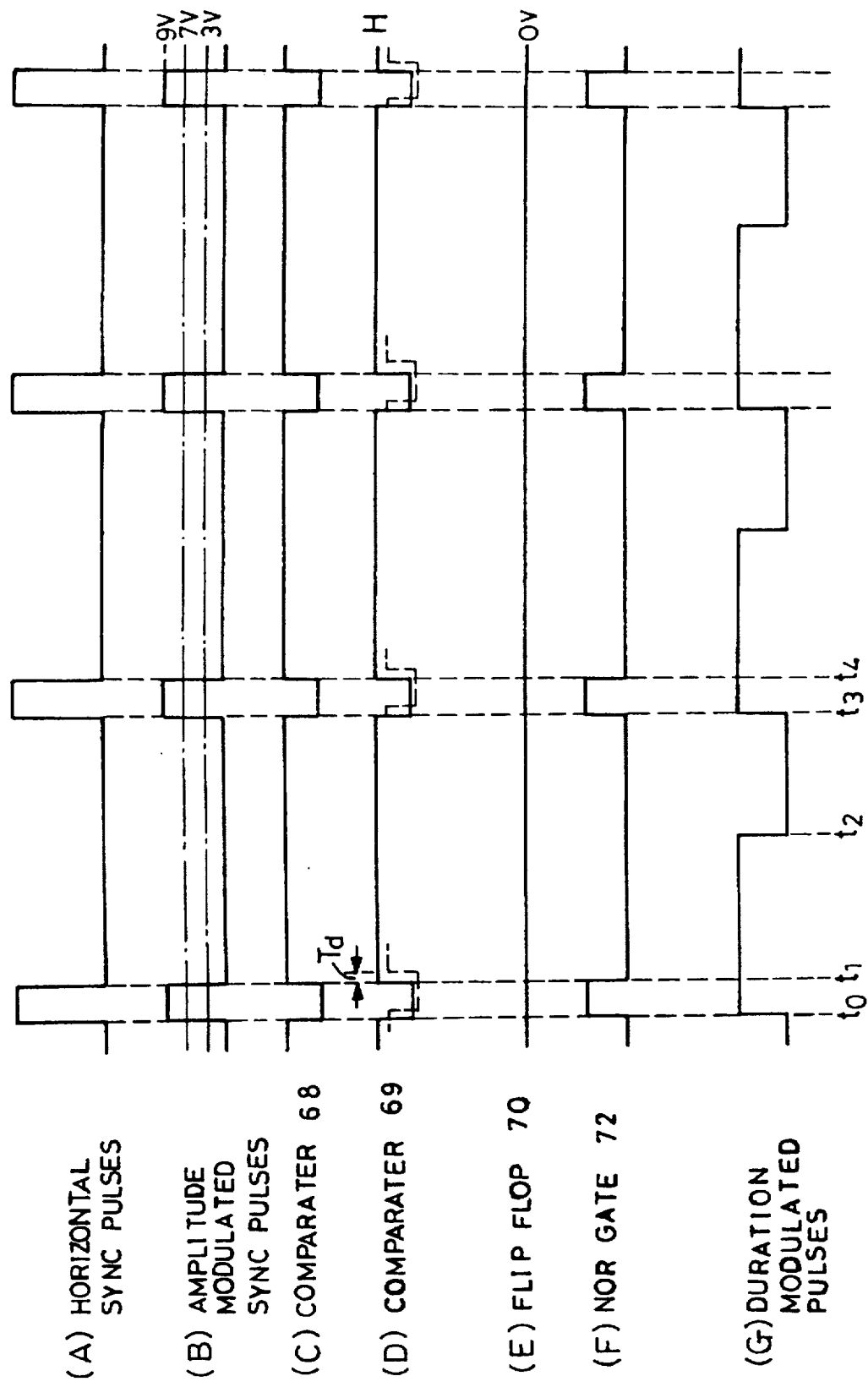
FIG. 5, consisting of (A) through (G), is a series of waveform diagrams useful in explaining the operation of the FIG. 1 power supply system when horizontal synchronizing pulses are being generated at the lower of two different predetermined repetition rates.
Figure 6:
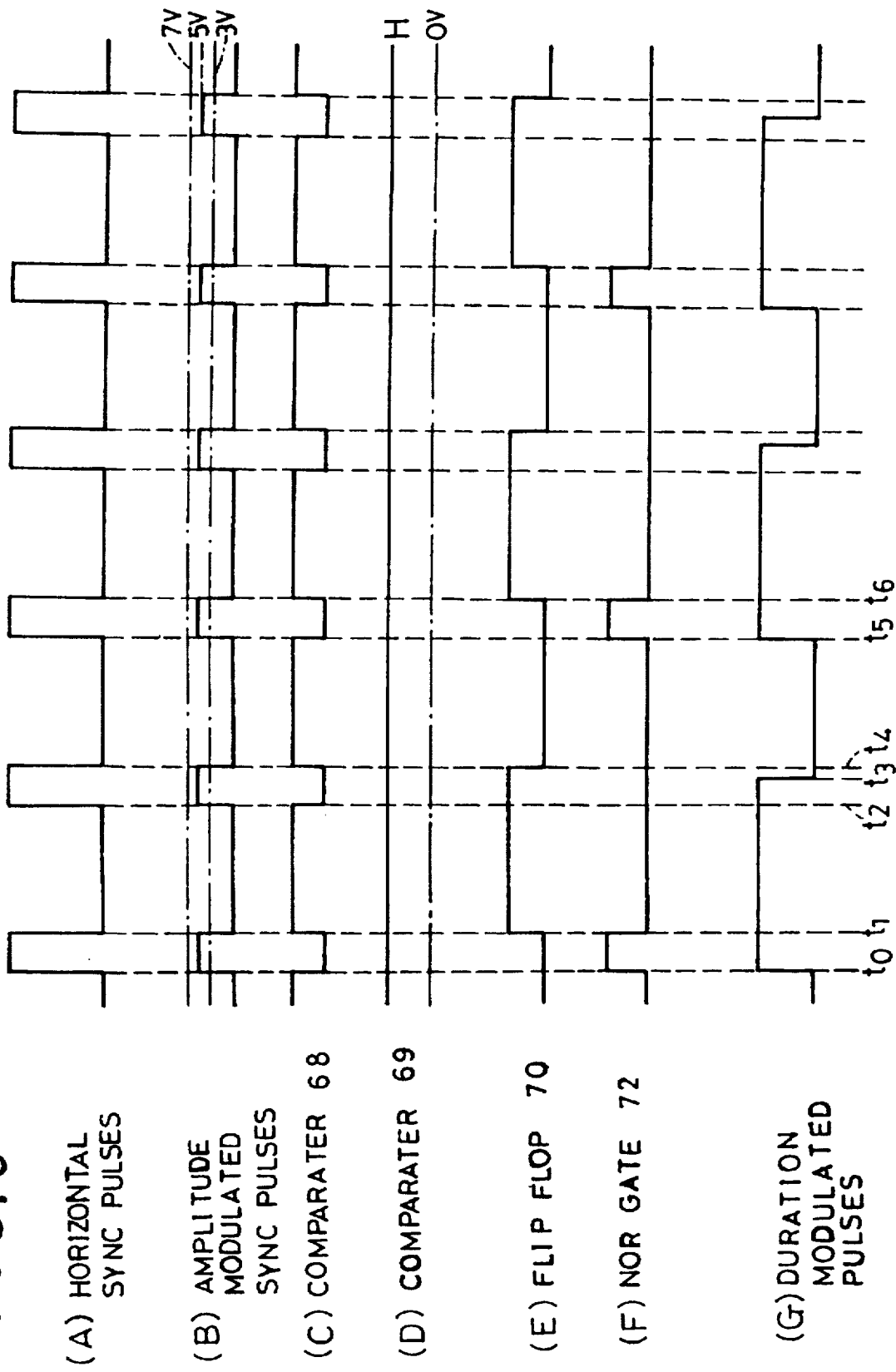
FIG. 6, consisting of (A) through (G), is a series of waveform diagrams useful in explaining the operation of the FIG. 1 power supply system when horizontal synchronizing pulses are being generated at the higher of the two different predetermined repetition rates.

Obtained on the output line 73a of the timing signal generator 64 is a series of timing pulses, shown at (F) in FIG. 5, which have the same repetition rate as that (e.g. 32 kHz) of the horizontal sync pulses, FIG. 5(A), commanded then by the host computer, or another series of timing pulses, shown at (F) in FIG. 6, which have one half of the repetition rate (e.g. 64 kHz) of the horizontal sync pulses, FIG. 6(A), commanded then by the host computer. Either of the two series of timing pulses determines the rate at which the FET 8 is switched, as will be detailed in the subsequent description of operation.

The switch control signal forming circuit 65 of FIG. 3 may be subdivided into a comparator 74, a sawtooth generator 75, a reference signal generator 76, a reference voltage source 77, the aforesaid transistor 73, and a diode 78. The sawtooth generator 75 comprises a capacitor 79, three resistors 80, 81 and 82, a transistor 83, and two diodes 84 and 85. The capacitor 79 is connected between supply terminal 62 and ground terminal 90 via the transistor 83 and diode 84, beside being connected to a first inverting input of the three input comparator 74. The resistor 80 is connected in parallel with the capacitor 79 in order to form a discharge circuit. The transistor 83 has its base connected to the reference voltage source 77 via the resistor 81 and to the output of the comparator 74 via a serial connection of the resistor 82 and diode 85. This serial connection of resistor and diode functions to cause nonconduction through the transistor 83 in the event of a drop in the output of the comparator 74 and hence to discontinue the charging of the capacitor 79. The comparator 74 has its noninverting input connected to the reference voltage source 77 via the resistor 81 and to its own output via the resistor 82 and diode 85. The output of the comparator 74 is further connected to the output 52 of the switch control circuit 51 via the switch driver circuit 66 of known construction.

The reference signal generator 76 comprises a capacitor 86, transistors 87 and 88, and a NOT circuit or inverter 89, in addition to the phototransistor 53 shown also in FIG. 1. The capacitor 86 is connected to the supply terminal 62 via the phototransistor 53 on one hand and, on the other hand, to the ground terminal 90. The transistor 87 is connected between the noninverting input of the comparator 74 and the ground terminal 90, and the base of the transistor 87 is connected to the capacitor 86. The discharge of the capacitor 86 is related to the output from the comparator 74 by connecting the transistor 88 in parallel with the capacitor 86, and the output of the comparator 74 is connected to the base of the transistor 88 via the NOT circuit 89.

The transistor 73 is connected between the second inverting input of the comparator 74 and the ground terminal 90 via the diode 78. The base of the transistor 73 is connected as aforesaid to the timing signal generator 64 in order to be turned on and off by the switching rate timing pulses and hence to determine the switching rate of the FET 8. The second inverting input to the comparator 74 is therefore to drop in potential upon conduction of the transistor 73, with the result that the output from this comparator goes high.

Figure 8:
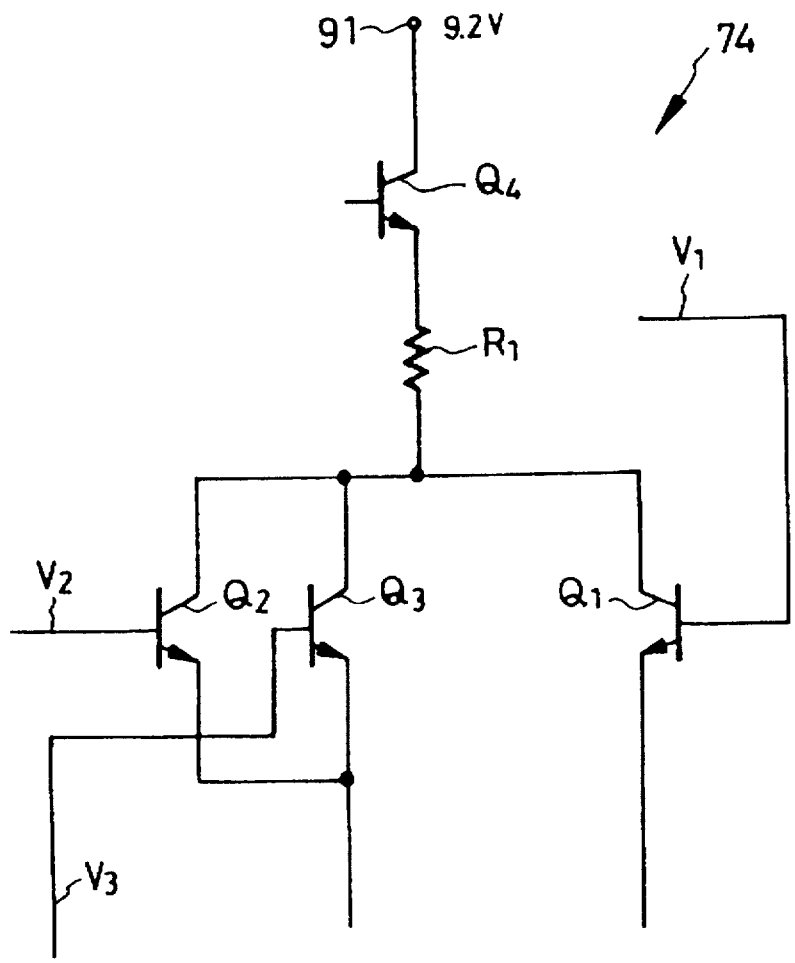
FIG. 8 is a schematic electrical diagram of the comparator used in the FIG. 3 switch control circuit.

As illustrated in part in FIG. 8, the comparator 74 can be of the familiar construction comprising three transistors $Q_1$, $Q_2$ and $Q_3$ constituting a differential amplifier, and a resistor $R_1$ and another transistor $Q_4$ connected in series with each other between the collectors of the first three transistors and a supply terminal 91. The transistors $Q_2$ and $Q_3$ are in parallel connection. The base of the second transistor $Q_2$ is connected to the capacitor 79, FIG. 3, the base of the transistor $Q_3$ to the diode 78, FIG. 3, and the base of the transistor $Q_1$ to the base of the transistor 83, FIG. 3.

OPERATION

Let it first be assumed that the host computer has delivered to the microprocessor 27 a command indicating 32 kHz as the repetition rate of the horizontal sync pulses of the cathode ray tube display. The horizontal sync control data extractor 48, FIG. 2, of the microprocessor 27 will derive this command from the incoming computer information and notify the horizontal sync timing signal generator 49 accordingly. The signal generator 49 will then respond by providing from the microprocessor output 29 the horizontal sync timing signal indicative of 32 kHz as the repetition rate of horizontal sync pulses to be produced.

Inputting this horizontal sync timing signal, the horizontal sync pulse generator 25, FIG. 1, of the load circuit 23 will generate horizontal sync pulses at the required 32 kHz, as at (A) in FIG. 5. The horizontal deflection circuit 26 will input the horizontal sync pulses via the transformer 30 and horizontally deflect the electron beam of the cathode ray tube.

The horizontal sync pulses will be further supplied from the transformer 30 to the amplitude modulator circuit 34 including the phototransistor 36. The repetition rate signal generator 50, FIG. 2, of the microprocessor 27 will go high when the commanded repetition rate of horizontal sync pulses is 32 kHz, thereby causing the LED 42 to glow. Irradiated by the LED 42, the phototransistor 36 will conduct to complete a parallel circuit of the resistors 37 and 39, so that there will be obtained across the resistor 38 the amplitude modulated horizontal sync pulses of relatively great amplitude, as at (B) in FIG. 5. The pulse amplitude in this case is 9 V.

On the other hand, when the host computer supplies a 64 kHz command for horizontal sync pulses, the microprocessor 27 will produce from its output 29 the horizontal sync timing signal indicative of that repetition rate. The pulse generator 25 of the load circuit 23 will respond to this timing signal by generating horizontal sync pulses at 64 kHz. The microprocessor 27 will also respond to the 64 kHz command by producing from its output 44 the low voltage signal indicative of that repetition rate. The LED 42 will then remain unlit, holding the phototransistor 36 nonconductive, with the result that the amplitude modulated horizontal sync pulses of reduced amplitude, 5 V in this case, will be obtained across the resistor 38, as at (B) in FIG. 6.

Directed into the switching rate timing signal generator 64, FIG. 3, of the switch control circuit 51, the FIG. 5(B) amplitude modulated pulses of 9 V amplitude will be directed into both comparators 68 and 69 for comparison with the reference voltages $E_1$ and $E_2$. Since the pulse amplitude in this case is higher than either of the reference voltages $E_1$ (3 V) and $E_2$ (7 V), the comparators 68 and 69 will produce "negative" pulses, as at (C) and (D) in FIG. 5, in synchronism with the incoming amplitude modulated pulses shown at (B) in FIG. 5.

As has been set forth with reference to FIG. 4, the output from the comparator 68 of the timing signal generator 64 is directed to the trigger input T of the flip flop 70, and the output from the other comparator 69 to the set input S of the same flip flop after being delayed a predetermined time Td by the delay circuit 71. No change will therefore take place in the output from the flip flop 70 when it is triggered by the trailing edge of each "negative" output from the comparator 68, as at $t_1$ in FIG. 5. The output from the flip flop 70 will remain low as at (E) in FIG. 5.

Figure 4:
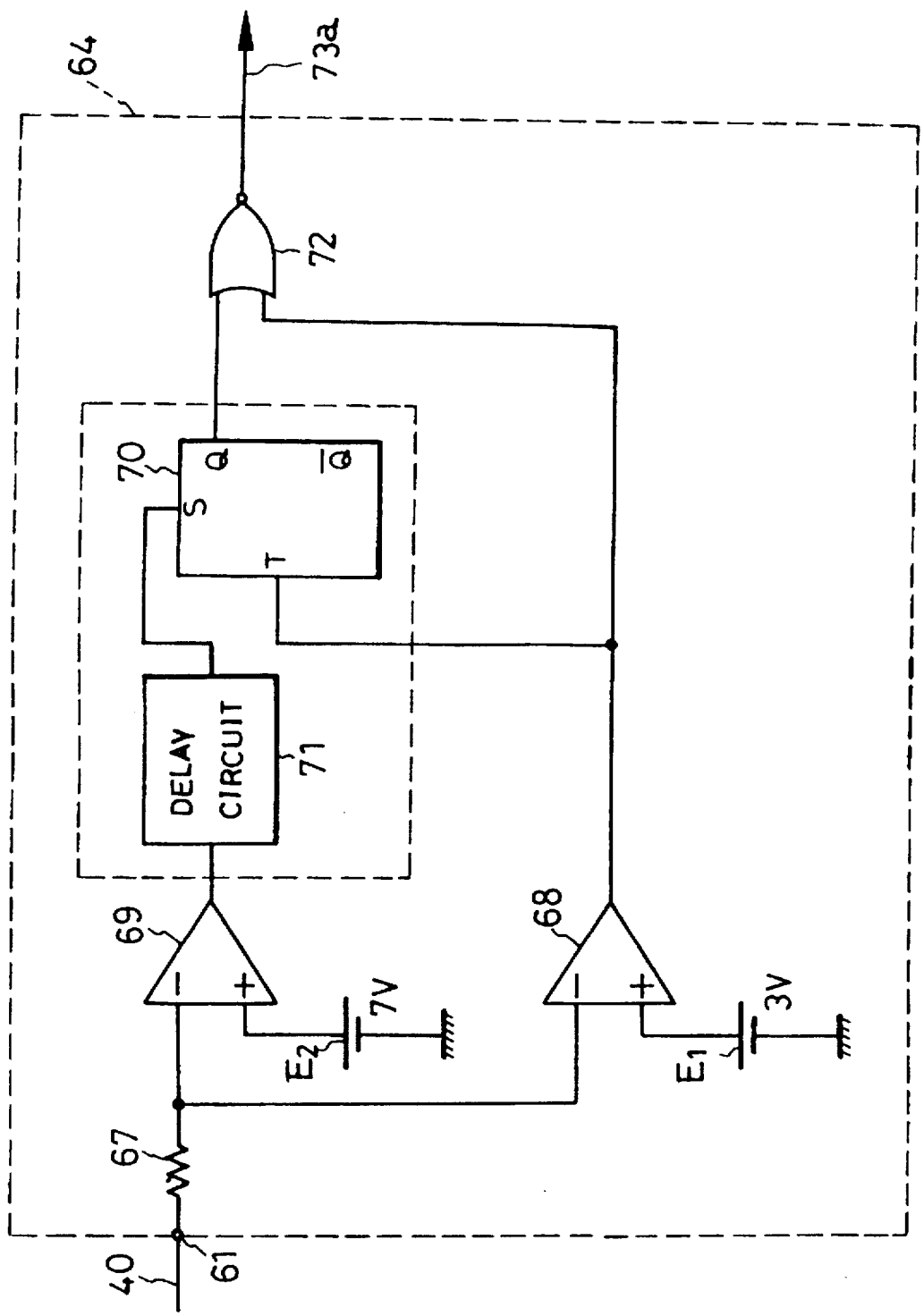
FIG. 4 is a schematic electrical diagram showing in more detail the switching rate timing signal generator included in the FIG. 3 switch control circuit.

The NOR gate 72, FIG. 4, of the timing signal generator 64 inputs the FIG. 5(C) "negative" output pulses from the comparator 68 and the FIG. 5(E) low output from the flip flop 70. As indicated at (F) in FIG. 5, the resulting output from the NOR gate 72 is a series of "positive" pulses synchronized with the "negative" output pulses from the comparator 68. The pulses thus obtained on the output line 73a of the timing signal generator 64 are the desired timing signal of the same repetition rate (32 kHz) as that of the FIG. 5(A) horizontal sync pulses for the determination of the switching frequency.

The FIG. 6(B) horizontal sync pulses of 5 V amplitude, on the other hand, will likewise be compared with the reference voltages $E_1$ and $E_2$ by the comparators 68 and 69 of the timing signal generator 64. Since the sync pulse amplitude is intermediate the two reference voltages $E_1$ and $E_2$, the comparator 68 will produce a series of "negative" pulses in synchronism with the horizontal sync pulses, as at (C) in FIG. 6, whereas the other comparator 69 will produce a continuously high output as at (D) in FIG. 6.

Applied to the set input S of the flip flop 70, the continuously high output from the comparator 69 will enable the flip flop to respond 8 to the "negative" output pulses from the comparator 68. The flip flop 70 will produce a series of pulses at half the repetition rate of the horizontal sync pulses, as at (E) in FIG. 6. The NOR gate 72 will then produce a series of pulses which are of the same duration as the horizontal sync pulses but half in repetition rate, as at (F) in FIG. 6; in other words, one cycle $t_0$-$t_5$ of the timing signal is twice the cycle $t_0$-$t_2$ of the 64 kHz horizontal sync pulses.

The FIG. 5(F) output from the NOR gate 72 is to be processed by the switch control signal forming circuit 65, FIG. 3, into the duration modulated pulses of FIG. 5(G), and the FIG. 6(F) output from the NOR gate 72 into the duration modulated pulses of FIG. 6(G). In either case the NOR gate output pulses serve as timing signal for determination of the switching rate, and the duration modulated pulses are obtained in synchronism with the NOR gate output pulses. The duration modulated pulses are applied via the switch driver circuit 66 to the gate of the FET 8, causing the same to turn on and off accordingly.

Thus, according to the present invention, the FET 8 is turned on and off at half the repetition rate of the horizontal sync pulses when that repetition rate is 64 kHz or more. The switching frequency of the FET is therefore one half of the case in which the switching element is operated at the same high repetition rate as the horizontal sync pulses, resulting in a decrease in switching loss and an increase in efficiency.

Figure 7:
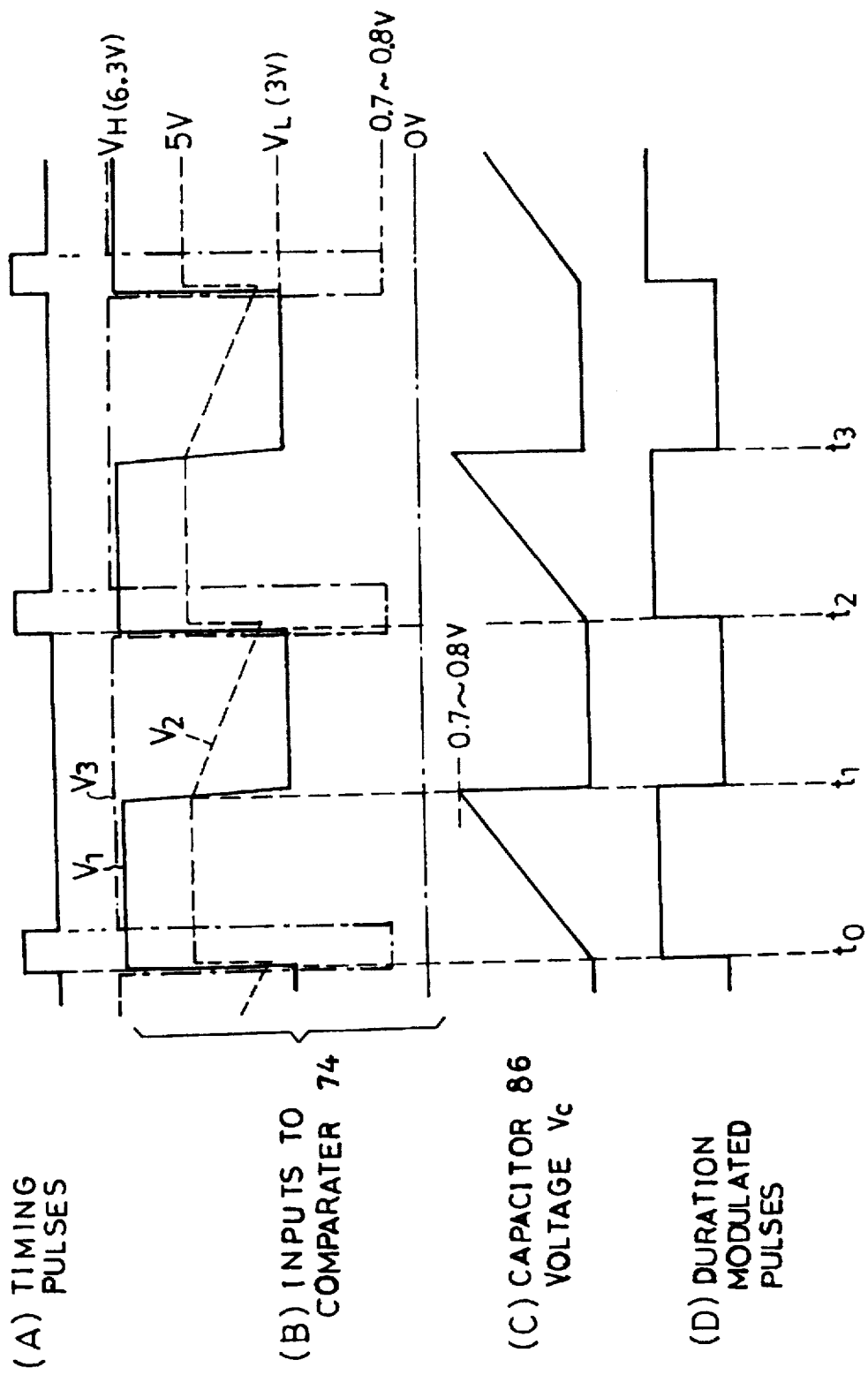
FIG. 7, consisting of (A) through (D), is a series of waveform diagrams useful in explaining the operation of the FIG. 3 switch control circuit.

Reference may be had to FIG. 7 for the following operational description of the switch control signal forming circuit 65, FIG. 3. Shown at (A) in FIG. 7 is the timing signal supplied over the line 73a to the switch control signal forming circuit 65. Assume that, before time to in FIG. 7, the voltage $V_1$ supplied to the positive input of the comparator 74 has had a low value $V_L$, and the voltage $V_2$ supplied to the first negative input of the comparator 74 has been higher than the voltage $V_1$, both as indicated at (B) in FIG. 7. If then a timing pulse is input at $t_0$, the transistor 73 will conduct thereby making the input voltage $V_3$ to the second negative input of the comparator 74 so low that this comparator will go high.

The feedback diode 85 of the sawtooth generator 75 will become nonconductive when the comparator 74 goes high as above, with the result that the voltage $V_1$ to the positive input of the comparator 74 will become high (6.3 V). Also, the transistor 83 of the sawtooth generator 75 will conduct, permitting the capacitor 79 to be charged from the reference voltage source 77, and thereby making high the voltage $V_2$ applied to the first negative input of the comparator 74. The capacitor 79 will be charged to the voltage $V_2$ which in this case is equal to the reference voltage Vr (6.3 V) minus the sum of the base-emitter voltage $V_{BE}$ and the voltage Vf of the diode; namely, $V_2 = Vr-(V_{BE}+Vf)$. The capacitor 79 will be charged rapidly since the capacitor charging circuit contains no resistive element.

The capacitor voltage V2, defined above, will remain at about 5 V during each conducting period, as from $t_0$ to $t_1$ in FIG. 7, of the transistor 83 and drop gradually during the following nonconducting period, as from $t_1$ to $t_2$, of the transistor as the capacitor 79 discharges via the resistor 80. A sawtooth wave will thus be obtained as indicated by the dashed line at (B) in FIG. 7. The moments $t_0$ and $t_2$ the comparator 74 goes high, that is, the moments of the leading edges of the duration modulated pulses shown at (D) in FIG. 7, are determined by the leading edges of the FIG. 7(A) timing signal supplied from its generator 64. The moments $t_1$ and $t_3$ of the trailing edges, on the other hand, of the FIG. 7(D) duration modulated pulses are determined by the output from the LED 59, FIG. 1, of the voltage control signal forming circuit 54, as will be described in more detail hereafter.

The CR time constant of the capacitor 86 and phototransistor 53, FIG. 3, of the reference signal generator 76 of the switch control circuit 51 is so much more than that of the capacitor 79 and its charging circuit that the voltage Vc of the capacitor 86 will build up slowly, as from $t_0$ to $t_1$ at (C) in FIG. 7, during the duration of each duration modulated pulse. No discharge takes place from the capacitor 86 during each such period because then the comparator 74 is high, the NOT circuit 89 low, and the transistor 88 off.

The transistor 87 of the reference signal generator 76 will conduct 3 when the capacitor voltage Vc rises to 0.7 or 0.8 V, as at $t_1$ in FIG. 7. The voltage $V_1$ on the positive input of the comparator 74 will drop with the conduction of the transistor 87 and become less than the sawtooth voltage $V_2$ on the first negative input of the comparator 74, so that the comparator 74 will go low at $t_1$. As the diode 85 becomes conductive resultantly, the voltage $V_1$ on the positive input of the comparator 74 will be fixed at 3 V after $t_1$. The voltage Vc of the capacitor 86 will drop instantly through the transistor 88 as this transistor becomes conductive in response to the high output from the NOT circuit 89.

The voltage $V_1$ on the positive input of the comparator 74 is less than the voltage $V_2$ on the first negative input of the comparator during the $t_1$-$t_2$ period. Both transistor 83 and diode 84 will therefore become nonconductive, preventing the capacitor 79 from being charged.

In event the voltage at the output terminal 22, FIG. 1, becomes too high, the phototransistor 53 will decrease in resistance thereby increasing the magnitude of the current charging the capacitor 86. The resulting high speed at which the capacitor 86 is charged to the voltage Vc will make the transistor 87 conductive in a shorter period of time after the comparator 74 has become high. The FIG. 7(D) output pulses of the switch control circuit 52 will thus become shorter in duration. Conversely, when the voltage at the output terminal 22 becomes too low, the output pulses will become longer in duration.

The illustrated power supply system includes the amplitude modulator circuit 34, FIG. 1, for modulating the amplitude of the horizontal sync pulses according to their repetition rates. Consequently, the output pulses of this circuit are indicative of their repetition rate by their amplitude, in addition to their cycles per unit length of time. The repetition rate of the amplitude modulated horizontal sync pulses is accurately detectable from their amplitude by the relatively simple circuit configuration of FIG. 4 comprising the two comparators 68 and 69.

Another advantage of the illustrated power supply system arises when no horizontal synchronizing pulses are being produced, the display being out of operation even though the computer system is powered on. Without horizontal synchronizing pulses there are, of course, no amplitude modulated pulses from the modulator circuit 34 and hence no switching rate timing pulses from the generator 64. Then the switch control signal forming circuit 65, FIG. 3, will produce duration modulated pulses at a rate (e.g. 20 kHz) lower than that of the output pulses (i.e. timing pulses) of the NOR gate 72, FIG. 4, shown at (F) in both FIGS. 5 and 6. These reduced rate pulses enable continued power supply to the microprocessor 27 via the transformer tertiary 14 and the rectifying and smoothing circuit 10. It will be noted that the switching element is turned on and off a smaller number of times per unit length of time when the display is standing by, so that less switching loss will occur than when the display is in operation.

The microprocessor 27 is a smaller load than the load circuit 23 including the horizontal deflector circuit 26, so that the duration modulated output pulses of the switch control signal forming circuit 65 become less in duty ratio. Should the duty ratio be made small when the duration modulated pulses are high in repetition rate, the pulses would of necessity decrease in duration, resulting in unstable control of the FET 8. Actually, no such inconvenience will occur. The pulse duration increases for powering a light load as the pulse repetition rate becomes as low as 20 kHz.

The switch control circuit 51, FIG. 1, is preferably fabricated in the form of a hybrid integrated circuit, as has been stated, the terminals of which should generally be as small in number as possible. It is favorable from this viewpoint that the switch control circuit 51 requires no dedicated terminal for inputting a signal indicative of the repetition rates of the horizontal synchronizing pulses, since the repetition rates are represented by the amplitudes of the amplitude modulated pulses put out by the amplitude modulator circuit 34.

SECOND FORM

Figure 9:
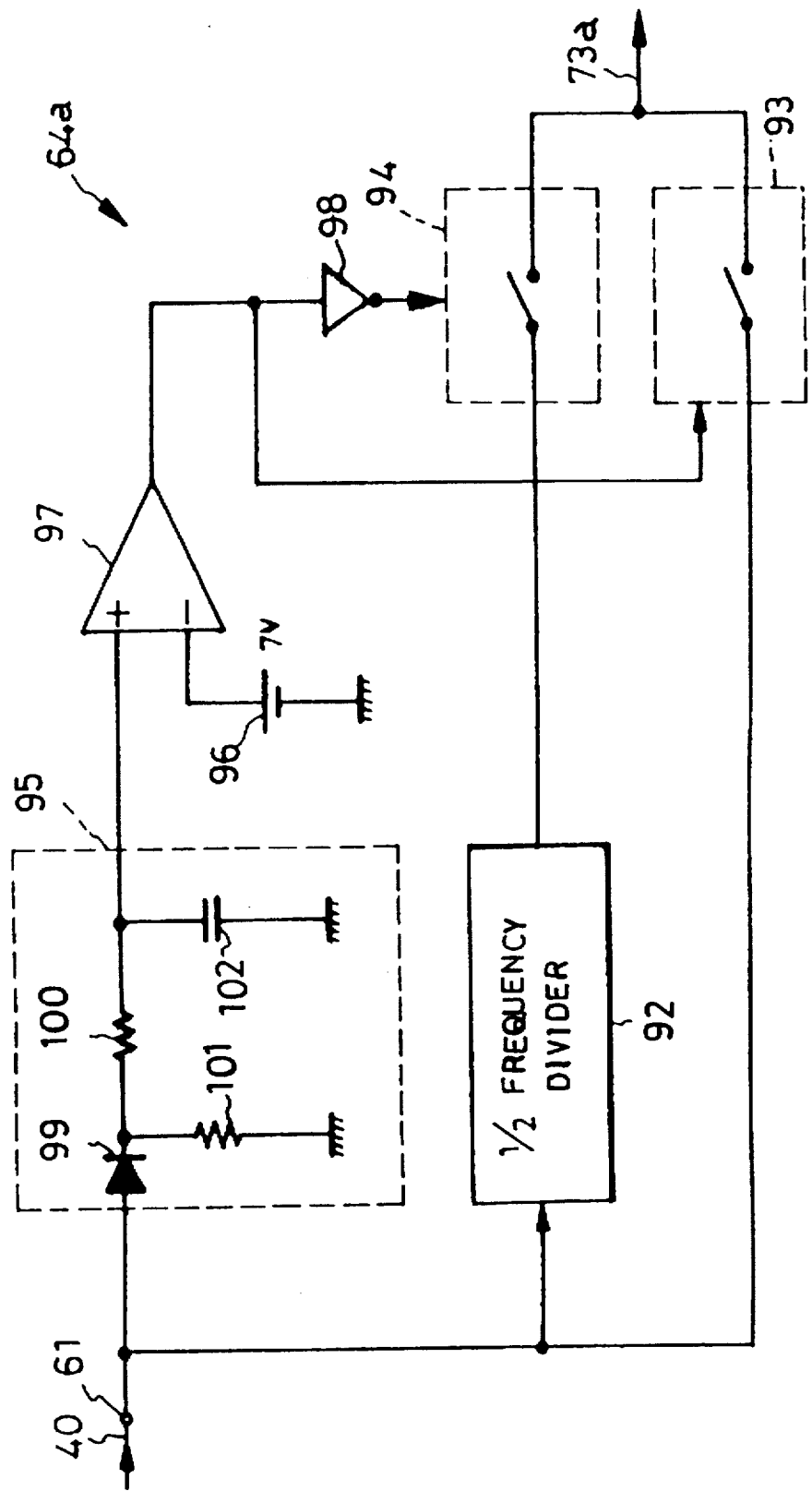
FIG. 9 is a schematic electrical diagram of a modified switching rate timing signal generator for use in the FIG. 3 switch control circuit in substitution for the FIG. 4 circuit.

FIG. 9 shows a modified timing signal generator 64a for use in the FIG. 1 power supply system in substitution for its counterpart 64 shown in detail in FIG. 4. The modified timing signal generator 64a includes a switch 93 connected between the terminal 61, which inputs the amplitude modulated horizontal sync pulses from the modulator circuit 34, FIG. 1, and the output line 73a over which the timing signal for determination of the switching frequency is delivered to the switch control signal forming circuit 65, FIG. 3. Normally open, this switch 93 is closed in response to a high output from a comparator 97.

A second switch 94 is connected to the input terminal 61 via a ½ frequency divider 92 on one hand and, on the other hand, directly to the output line 73a. The frequency divider 92 provides pulses that have half the repetition rate of the input horizontal sync pulses. A NOT circuit 98 inverts a low output from the comparator 97 for closing the switch 94.

Connected between the input terminal 61 and the positive input of the comparator 97, a peak hold circuit 95 functions as an integrating or smoothing circuit, holding the peaks of the horizontal sync pulses. It comprises a diode 99, resistors 100 and 101, and a capacitor 102. The capacitor 102, connected between the input terminal 61 and the ground via the diode 99 and resistor 100, holds the maximum amplitude of the amplitude modulated horizontal sync pulses, that is, nine volts when the FIG. 5(B) pulses are supplied, and five volts when the FIG. 6(B) pulses are supplied.

The comparator 97 compares the output from the peak hold circuit 95 with a reference voltage of, say, seven volts from its source 96. Thus the comparator 97 goes high when the voltage on the capacitor 102 is more than the reference voltage, closing the first switch 93, and low when the capacitor voltage is less than the reference voltage, closing the other second switch 94. The first switch 93 is therefore closed when the horizontal sync pulses are supplied at a rate of 32 kHz, permitting the passage of the 32 kHz pulses therethrough as the timing signal. The second switch 94 is closed when the horizontal sync pulses are supplied at 64 kHz, permitting the passage therethrough of the 32 kHz pulses obtained as the 64 kHz pulses are directed through the ½ frequency divider 92.

POSSIBLE MODIFICATIONS

Despite the foregoing detailed disclosure it is not desired that the present invention be limited by the exact showing of the drawings or the description thereof. The following is a brief list of possible modifications of the illustrated embodiments:

1. The horizontal sync pulse amplitude modulator circuit 34, FIG. 1, could be connected between horizontal sync pulse generator 25 and transformer primary 31.

2. The transformer windings 13 and 14, FIG. 1, could be so polarized that the diodes 16 and 18 were conductive, instead of being nonconductive as in the illustrated embodiment, during the conduction of the FET 8.

3. The duration modulated pulses could be generated in synchronism with the trailing edges of the FIGS. 5(F) and 6(F) pulses for determination of the switching frequency.

4. The voltage of the transformer quaternary 15, FIG. 1, could be utilized for pulse duration modulation, thereby dispensing with the voltage control signal forming circuit 54. A voltage corresponding to the transformer tertiary 13 is induced on the transformer quaternary 15 during the nonconducting periods of the FET 8, so that the output voltage can be indirectly detected from the transformer quaternary 15. As a further alternative, the output voltage might be detected from an additional transformer winding provided exclusively for that purpose.

5. The d.c. to d.c. converter circuit 6 could be modified to include, for example, a bridge or half bridge connection of switching elements.

Figure 10:
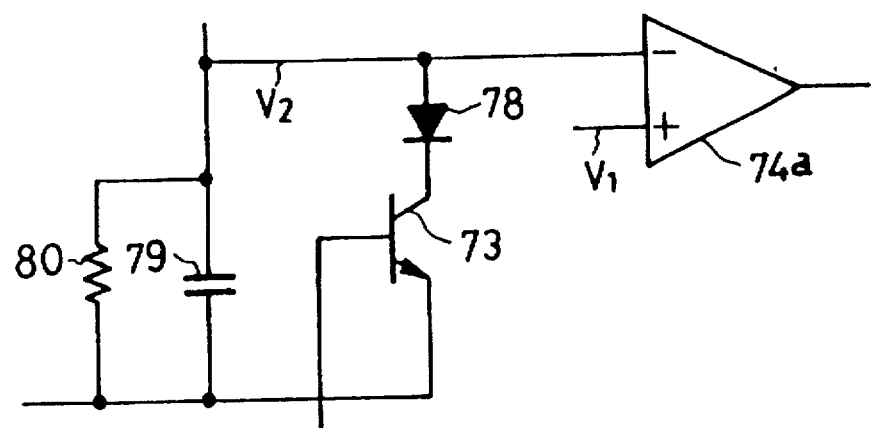
FIG. 10 is a schematic electrical diagram of a modified comparator and associated input means for use in the FIG. 3 switch control circuit.

6. The transistor $Q_3$, FIG. 8, of the comparator 74 of the switch control circuit 51, FIG. 3, could be omitted, and the resulting comparator 74a connected as shown in FIG. 10 instead of as in FIG. 3. The transistor 73 for control of the switching frequency is therein shown connected in parallel with the capacitor 79 via the diode 78, the capacitor being compulsorily discharged by the timing signal.

All these and other modifications and alterations of the illustrated embodiments within the common knowledge of the specialists are intended in the foregoing disclosure. It is therefore appropriate that the invention be construed broadly and in a manner consistent with the fair meaning or proper scope of the subjoined claims.

What is claimed is:

1. A switching power supply system suitable for powering a load circuit in a display, among other applications, the load circuit including a horizontal synchronizing pulse generator circuit which generates a series of horizontal synchronizing pulses at either of at least two different predetermined repetition rates for delivery to a horizontal deflection circuit, the switching power supply system comprising:

(a) a d.c. to d.c. converter circuit to be connected to the load circuit for powering the same, the d.c. to d.c. converter having a switching element for on-off control of a unidirectional voltage, and means for smoothing the unidirectional voltage after the on-off control thereof by the switching element;

(b) horizontal synchronization timing signal generator means to be connected to the horizontal synchronizing pulse generator circuit of the load circuit for generating a horizontal synchronization timing signal indicative of a required repetition rate of horizontal synchronizing pulses, the horizontal synchronizing pulse generator circuit being responsive to the horizontal synchronization timing signal for generating horizontal synchronizing pulses at the required repetition rate;

(c) repetition rate signal generator means for generating a repetition rate signal indicative of whether the repetition rate of the horizontal synchronizing pulses being generated by the horizontal synchronizing pulse generator circuit is less than a predetermined value;

(d) a pulse amplitude modulator circuit associated with the repetition rate signal generator means and to be connected to the horizontal synchronizing pulse generator circuit of the load circuit for providing, in response to the repetition rate signal, amplitude modulated pulses which have the same repetition rate as the horizontal synchronizing pulses being generated by the horizontal synchronizing pulse generator circuit and which have either of two different predetermined amplitudes depending upon whether the repetition rate of the horizontal synchronizing pulses being generated is less than the predetermined value;

(e) a switching rate timing signal generator circuit connected to the pulse amplitude modulator circuit for generating a series of switching rate timing pulses at the same repetition rate as that of the horizontal synchronizing pulses being generated when the amplitude of the amplitude modulated pulses indicate that the repetition rate of these horizontal synchronizing pulses is less than the predetermined value, and, when the amplitude of the amplitude modulated pulses indicate that the repetition rate of the horizontal synchronizing pulses being generated is not less than the predetermined value, at a repetition rate lower than that of these horizontal synchronizing pulses; and (f) a switch control signal forming circuit connected between the switching rate timing signal generator circuit and the switching element of the d.c. to d.c. converter circuit for turning the switching element on and off at a rate determined by the repetition rate of the incoming switching rate timing pulses.

2. The switching power supply system of claim 1 wherein the d.c. to d.c. converter circuit comprises a transformer to be connected between a source of the unidirectional voltage and the load circuit, the transformer having a primary winding connected across the unidirectional voltage source via the switching element, and a secondary winding connected to the smoothing means.

3. The switching power supply system of claim 1 wherein the repetition rate signal generator means comprises:

(a) a voltage signal generator circuit for generating the repetition rate signal in the form of a binary voltage signal; and (b) means connected to the voltage signal generator circuit for translating the binary voltage signal into an optical signal for transmission to the pulse amplitude modulator circuit.

4. The switching power supply system of claim 3 wherein the pulse amplitude modulator circuit comprises a light receptor responsive to the optical signal for varying the amplitude of the horizontal synchronizing pulses from the horizontal synchronizing pulse generator circuit into either of the two predetermined values in order to provide the amplitude modulated pulses.

5. The switching power supply system of claim 1 wherein the switching rate timing signal generator circuit comprises:

(a) a source of a first reference voltage lower than the two predetermined amplitudes of the amplitude modulated pulses;

(b) a source of a second reference voltage intermediate the two predetermined amplitudes of the amplitude modulated pulses;

(c) a first comparator having an input connected to the pulse amplitude modulator circuit and another input to the first reference voltage source for providing an output indicative of whether the amplitude of the amplitude modulated pulses is greater than the first reference voltage or not;

(d) a second comparator having an input connected to the pulse amplitude modulator circuit and another input to the second reference voltage source for providing an output indicative of whether the amplitude of the amplitude modulated pulses is greater than the second reference voltage or not;

(e) a delay circuit connected to the second comparator for delaying the output therefrom a period of time shorter than the duration of each amplitude modulated pulse;

(f) a trigger flip flop having a trigger input connected to the first comparator, and a set input connected to the delay circuit; and (g) a gate circuit having an input connected to the trigger flip flop, and another input to the first comparator.

6. The switching power supply system of claim 1 wherein the switch control signal forming circuit comprises:

(a) a sawtooth generator for generating a sawtooth wave;

(b) a reference signal generator for generating a reference signal for comparison with the sawtooth wave;

(c) a switching rate determination element connected to the switching rate timing signal generator circuit for synchronizing the sawtooth wave with the switching rate timing pulses; and (d) a pulse forming element connected to the sawtooth generator and the reference signal generator and the switching rate determination element for turning the switching element of the d.c. to d.c. converter on and off at a rate determined by the repetition rate of the switching rate timing pulses and at a lower rate in the absence of the switching rate timing pulses.

7. The switching power supply system of claim 1 wherein the switching rate timing signal generator circuit comprises:

(a) a frequency divider connected to the pulse amplitude modulator circuit for dividing the repetition rate of the amplitude modulated pulses, and hence of the horizontal synchronizing pulses being generated, into a prescribed submultiple;

(b) a smothing circuit connected to the pulse amplitude modulated circuit;

(c) a source of a reference voltage that is intermediate voltages obtained when the amplitude modulated pulses of the two predetermined amplitudes are smoothed by the smoothing circuit;

(d) a comparator having an input connected to the smoothing circuit and another input to the reference voltage source;

(e) a first switch connected between the pulse amplitude modulator circuit and the switch control signal forming circuit and responsive to an output from the comparator for permitting the passage of the amplitude modulated pulses therethrough when an output voltage from the smoothing circuit is higher than the reference voltage; and (f) a second switch connected between the frequency divider and the switch control signal forming circuit and responsive to the output from the comparator for permitting the passage therethrough of the amplitude modulated pulses having a repetition rate that is the prescribed submultiple of the repetition rate of the horizontal synchronizing pulses being generated, when the output from the smoothing circuit is less than the reference voltage.

* * * * *